US011009879B2

(12) United States Patent
Vichik et al.

(10) Patent No.: US 11,009,879 B2
(45) Date of Patent: May 18, 2021

(54) SYSTEMS AND METHODS FOR CONTROLLING AN AERIAL VEHICLE USING LATERAL PROPULSION AND VERTICAL MOVEMENT

(71) Applicant: LOON LLC, Mountain View, CA (US)

(72) Inventors: Sergey Vichik, Palo Alto, CA (US); Cyrus Behroozi, Menlo Park, CA (US); C. O. Lee Boyce, Jr., Mountain View, CA (US)

(73) Assignee: Loon LLC, Mountain View, CA (US)

( * ) Notice: Subject to any disclaimer, the term of this patent is extended or adjusted under 35 U.S.C. 154(b) by 33 days.

(21) Appl. No.: 16/734,547

(22) Filed: Jan. 6, 2020

(65) Prior Publication Data
US 2020/0183399 A1 Jun. 11, 2020

Related U.S. Application Data

(63) Continuation of application No. 15/711,003, filed on Sep. 21, 2017, now Pat. No. 10,558,219.

(51) Int. Cl.
*G05D 1/02* (2020.01)
*B64C 19/02* (2006.01)
(Continued)

(52) U.S. Cl.
CPC ........... *G05D 1/0204* (2013.01); *B64C 19/02* (2013.01); *G05D 1/046* (2013.01); *G05D 1/101* (2013.01); *G05D 1/102* (2013.01)

(58) Field of Classification Search
CPC ...... G05D 1/0204; G05D 1/102; G05D 1/101; G05D 1/046; B64C 19/02; B64B 1/02; B64B 1/62
See application file for complete search history.

(56) References Cited

U.S. PATENT DOCUMENTS 1,825,184 A 9/1931 Ignatz
3,069,114 A 12/1962 Maas
(Continued)

FOREIGN PATENT DOCUMENTS

CA 2774443 A1 3/2010
CA 2949115 A1 12/2015
(Continued)

OTHER PUBLICATIONS

International Search Report and Written Opinion for Application No. PCT/US20/35173 dated Sep. 15, 2020.
(Continued)

*Primary Examiner* — Marthe Y Marc-Coleman
(74) *Attorney, Agent, or Firm* — Botos Churchill IP Law

(57) ABSTRACT

An aerial vehicle control system includes an aerial vehicle and a computing device. The aerial vehicle includes an altitude controller and a lateral propulsion controller. The computing device includes a processor and a memory. The memory stores instructions that, when executed by the processor, cause the computing device to obtain location data corresponding to a location of the aerial vehicle; obtain wind data; determine an altitude command, a latitude command, and a longitude command based on at least one of the location data or the wind data; cause the altitude controller to implement at least one of the altitude command, the latitude command, or the longitude command; and cause the lateral propulsion controller to implement at least one of the altitude command, the latitude command, or the longitude command.

20 Claims, 5 Drawing Sheets

(51) Int. Cl.
*G05D 1/10* (2006.01)
*G05D 1/04* (2006.01)

(56) References Cited

U.S. PATENT DOCUMENTS

| | | | |
|---|---|---|---|
| 3,976,265 | A | 8/1976 | Doolittle |
| 4,204,656 | A | 5/1980 | Seward |
| 4,605,355 | A | 8/1986 | Davis et al. |
| 4,695,012 | A | 9/1987 | Lindenbaum |
| 4,889,297 | A | 12/1989 | Ikeda |
| 4,934,631 | A | 6/1990 | Birbas |
| 4,984,757 | A | 1/1991 | Hartung et al. |
| 4,995,572 | A | 2/1991 | Piasecki |
| 5,074,489 | A | 12/1991 | Gamzon |
| 5,082,205 | A | 1/1992 | Caufman |
| 5,518,205 | A | 5/1996 | Wurst |
| 5,906,335 | A | 5/1999 | Thompson |
| 6,167,263 | A | 12/2000 | Campbell |
| 6,220,543 | B1 | 4/2001 | Uskolovsky |
| 6,386,480 | B1 | 5/2002 | Perry et al. |
| 6,402,090 | B1 | 6/2002 | Aaron |
| 6,422,506 | B1 | 7/2002 | Colby |
| 6,520,824 | B1 | 2/2003 | Caroselli |
| 6,628,941 | B2 | 9/2003 | Knoblach et al. |
| 7,203,491 | B2 | 4/2007 | Knoblach et al. |
| 7,341,223 | B2 | 3/2008 | Chu |
| 7,356,390 | B2 | 4/2008 | Knoblach et al. |
| 7,469,857 | B2 | 12/2008 | Voss |
| 7,801,522 | B2 | 9/2010 | Knoblach et al. |
| 8,544,788 | B1 | 10/2013 | Capper |
| 8,820,678 | B2 | 9/2014 | Devaul et al. |
| 8,825,232 | B2 | 9/2014 | Knoblach et al. |
| 8,967,533 | B2 | 3/2015 | Devaul et al. |
| 9,139,279 | B2 | 9/2015 | Heppe |
| 9,193,480 | B2 | 11/2015 | Smith et al. |
| 9,296,461 | B1 | 3/2016 | Roach |
| 9,327,619 | B2 | 5/2016 | Taylor et al. |
| 9,327,818 | B1 | 5/2016 | Roach |
| 9,329,600 | B2 | 5/2016 | Devaul et al. |
| 9,409,646 | B2 | 8/2016 | Fleck |
| 9,418,243 | B2 | 8/2016 | Bauer et al. |
| 9,419,902 | B1 | 8/2016 | Sites |
| 9,420,023 | B2 | 8/2016 | Ramamurthy et al. |
| 9,519,045 | B2 | 12/2016 | Knoblach et al. |
| 9,632,503 | B2 | 4/2017 | Knoblach et al. |
| 9,663,227 | B1 | 5/2017 | Lema et al. |
| 9,665,094 | B1* | 5/2017 | Russell .......... B64D 47/08 |
| 9,836,063 | B1 | 12/2017 | Bonawitz et al. |
| 10,538,323 | B2 | 1/2020 | Rancourt et al. |
| 2005/0090972 | A1 | 4/2005 | Bodin et al. |
| 2006/0074557 | A1 | 6/2006 | Mulligan et al. |
| 2007/0138336 | A1 | 6/2007 | Palmer |
| 2008/0011900 | A1 | 1/2008 | Quintana |
| 2009/0072082 | A1 | 3/2009 | Arel |
| 2009/0125163 | A1 | 5/2009 | Duggan et al. |
| 2009/0152391 | A1 | 6/2009 | Mcwhirk |
| 2009/0302149 | A1 | 12/2009 | Fuchs et al. |
| 2010/0013226 | A1 | 1/2010 | Blumer et al. |
| 2010/0018566 | A1 | 1/2010 | Jackson |
| 2010/0230968 | A1 | 9/2010 | Chernyshov |
| 2011/0192938 | A1 | 8/2011 | Dimarzio et al. |
| 2011/0233325 | A1 | 9/2011 | Kramer |
| 2012/0138733 | A1 | 6/2012 | Hiebl et al. |
| 2012/0234965 | A1 | 9/2012 | Heppe |
| 2012/0241554 | A1 | 9/2012 | Davidson et al. |
| 2012/0312919 | A1 | 12/2012 | Heppe |
| 2013/0118856 | A1 | 5/2013 | Long |
| 2014/0054412 | A1 | 2/2014 | Guetta et al. |
| 2014/0097289 | A1 | 4/2014 | Heppe |
| 2014/0263823 | A1 | 9/2014 | Wang et al. |
| 2015/0078620 | A1 | 3/2015 | Ledergerber et al. |
| 2015/0142211 | A1 | 5/2015 | Shehata et al. |
| 2015/0166165 | A1 | 6/2015 | Kelly et al. |
| 2015/0232181 | A1 | 8/2015 | Oakley et al. |
| 2015/0266560 | A1 | 9/2015 | Ratner et al. |
| 2015/0323930 | A1* | 11/2015 | Downey .......... G08G 5/0026 701/2 |
| 2016/0018823 | A1 | 1/2016 | Longmier et al. |
| 2016/0159460 | A1 | 6/2016 | Laurenceau et al. |
| 2016/0202704 | A1 | 7/2016 | Hoheisel et al. |
| 2016/0288894 | A1 | 10/2016 | Sehnert et al. |
| 2017/0029111 | A1 | 2/2017 | Elson |
| 2017/0113787 | A1 | 4/2017 | Hein |
| 2017/0277180 | A1 | 9/2017 | Baer et al. |
| 2017/0227965 | A1 | 10/2017 | Decenzo et al. |
| 2017/0297724 | A1 | 10/2017 | Leidich et al. |
| 2018/0134414 | A1 | 5/2018 | Alikouhi |
| 2018/0304981 | A1 | 10/2018 | Piette et al. |
| 2019/0030447 | A1 | 1/2019 | Zima |
| 2019/0077510 | A1 | 3/2019 | Panas et al. |
| 2019/0152577 | A1 | 5/2019 | Kim |
| 2019/0329855 | A1 | 10/2019 | Vestergaard Frandsen et al. |
| 2019/0359308 | A1 | 11/2019 | Azevedo et al. |
| 2020/0031086 | A1 | 1/2020 | Paulson et al. |
| 2020/0094450 | A1 | 3/2020 | Cordell et al. |
| 2020/0165919 | A1 | 5/2020 | Le-Meur et al. |
| 2020/0247561 | A1 | 8/2020 | Rivera |

FOREIGN PATENT DOCUMENTS

| | | |
|---|---|---|
| CN | 205239886 U | 5/2016 |
| EP | 1772375 A2 | 4/2007 |
| WO | WO2014031375 A1 | 2/2014 |
| WO | 2017213706 A1 | 12/2017 |

OTHER PUBLICATIONS

"International Search Report and Written Opinion received for PCT Patent Application No. PCT/US2018/051985, dated Jan. 16, 2019", 14 pages.

Aaron , et al., "A Method for Balloon Trajectory Control", Global Aerospace Corporation, 2000, 6 pages.

Ardema, Mark D, "Missions and Vehicle Concepts for Modern, Propelled, Lighter-Than-Air Vehicles", Advisory Group for Aerospace Research and Development, Feb. 1985, 54 pages.

Barnes , et al., "AVIATR-Aerial Vehicle for In-situ and Airborne Titan Reconnaissance: A Titan Airplane Mission Concept", Jan. 2011, 74 pages.

Beemer , et al., "POBAL-S, The Analysis and Design of a High Altitude Airship", National Technical Information Service, Feb. 15, 1975, 183 pages.

Carten Jr., Andrew S, "An Investigation of the Applicability of High Altitude, Lighter-Than-Air (LTA) Vehicles to the Tactical Communications Relay Problem", National Technical Information Service, Aug. 20, 1974, 62 pages.

Carten Jr., Andrew S, "Proceedings of AFCRL Scientific Balloon Symposium (8th) Held at Hyannis, Massachusetts on Sep. 30, to Oct. 3, 1974", National Technical Information Service, Aug. 21, 1974, 579 pages.

Eppler , et al., "Aerodynamic Design of a Propeller for High-Altitude Balloon Trajectory Control", National Aeronautics and Space Administration, Mar. 2012, 59 pages.

Knaupp , et al., "Solar Powered Airship-Challenge and Chance", Conference Record of the Twenty Third IEEE Photovoltaic Specialists Conference, May 10-14, 1993, pp. 1314-1319.

Leclaire , et al., "The Powered Balloon System", Air Force Cambridge Research Laboratories, Sep. 1972, pp. 117-130.

Mayer, Norman J, "Current Developments Lighter Than Air Systems", United Nations Industrial Development Organization (UNIDO) Conference on LTA Systems Technology for the Benefit of Developing Countries, Vienna, Oct. 19-22, 1981, 16 pages.

Petrone , et al., "High Altitude Superpressured Powered Aerostat (HASPA)", Naval Ordnance Laboratory, Oct. 1974, 32 pages.

Smith , et al., "Development of a Small Stratospheric Station Keeping Balloon System", Japanese Society for Aeronautical and Space Sciences and ISTS, 2000, pp. 1-6.

Vorachek, J. J, "A Comparison of Several Very High Altitude Station Keeping Balloon Concepts", Goodyear Aerospace Corporation, Jun. 1970, pp. 355-381.

(56) References Cited

OTHER PUBLICATIONS

Vorachek, et al., "Development of a Free Balloon Propulsion System", Goodyear Aerospace Corporation, Feb. 22, 1973, 152 pages.
Wu, et al., "A Broadband Wireless Access System Using Stratospheric Platforms", IEEE, 2000, pp. 225-230.
International Search Report and Written Opinion for Application No. PCT/US2018/064476 dated Mar. 29, 2019, 10 pages.

* cited by examiner

SYSTEMS AND METHODS FOR CONTROLLING AN AERIAL VEHICLE USING LATERAL PROPULSION AND VERTICAL MOVEMENT

CROSS-REFERENCE TO RELATED APPLICATIONS

The present application is a continuation of U.S. application Ser. No. 15/711,003, filed Sep. 21, 2017, the entire disclosure of which is incorporated by reference herein.

BACKGROUND

A conventional airship, to maintain its position within the air or to move to a new position, requires a capability of propelling itself at an airspeed that is at least equal in magnitude to that of the experienced wind speed. However, because airship size, power, and cost are proportional to the cube of airspeed, a conventional airship may not be cost-effective for certain applications. Other aerial vehicles, such as balloons, can move vertically to exploit various wind directions to maintain its position within the air or to move to a new position. However, in some instances, the ability of such an aerial vehicle to maintain or move its position based on wind may be limited owing to wind characteristics associated with geographical zones or seasons.

SUMMARY

In one aspect, this disclosure describes an aerial vehicle control system including an aerial vehicle and a computing device. The aerial vehicle includes an altitude controller and a lateral propulsion controller. The computing device includes a processor and a memory. The memory stores instructions that, when executed by the processor, cause the computing device to: obtain location data corresponding to a location of the aerial vehicle; obtain wind data; determine an altitude command, a latitude command, and a longitude command based on at least one of the location data or the wind data; cause the altitude controller to implement at least one of the altitude command, the latitude command, or the longitude command; and cause the lateral propulsion controller to implement at least one of the altitude command, the latitude command, or the longitude command.

In embodiments, the memory stores further instructions that, when executed by the processor, cause the computing device to obtain a navigation command corresponding to at least one of a desired altitude of the aerial vehicle, a desired latitude coordinate of the aerial vehicle, or a desired longitude coordinate of the aerial vehicle. The determining of the altitude command, the latitude command, and the longitude command is further based on the navigation command.

In embodiments, the altitude command is implemented by the altitude controller so that the aerial vehicle is positioned at the desired altitude, within a tolerance threshold, and the latitude command and the longitude command are implemented by the lateral propulsion controller so that the aerial vehicle is positioned at the desired latitude coordinate and the desired longitude coordinate, within a tolerance threshold.

In embodiments, the location data includes at least one of: altitude data corresponding to an altitude of the aerial vehicle, latitude data corresponding to a latitude coordinate of the aerial vehicle, or longitude data corresponding to a longitude coordinate of the aerial vehicle, and wherein the determining of the altitude command, the latitude command, and the longitude command is further based on at least one of the altitude data, the latitude data, or the longitude data.

In embodiments, the computing device is communicatively coupled to the aerial vehicle by way of a wireless communication link, and the memory stores further instructions that, when executed by the processor, cause the computing device to transmit the altitude command, the latitude command, and the longitude command to the aerial vehicle via the wireless communication link, to cause the altitude controller to implement at least one of the altitude command, the latitude command, or the longitude command, and to cause the lateral propulsion controller to implement at least one of the altitude command, the latitude command, or the longitude command.

In embodiments, the aerial vehicle further includes a sensor, and the memory stores further instructions that, when executed by the processor, cause the computing device to obtain the location data from the sensor by way of the wireless communication link.

In embodiments, the wind data corresponds to wind at or near at least one of the location of the aerial vehicle or the altitude of the aerial vehicle.

In embodiments, the wind data is obtained from a data source including at least one of a publicly available weather data source or a data source including data aggregated from a plurality of aerial vehicles.

In embodiments, the aerial vehicle further includes an air-gas altitude control system; and a propeller. The memory stores further instructions that, when executed by the processor, cause the computing device to: cause the altitude controller to implement at least one of the altitude command, the latitude command, or the longitude command by causing the altitude controller to actuate the air-gas altitude control system based on at least one of the altitude command, the latitude command, or the longitude command; and cause the lateral propulsion controller to implement at least one of the altitude command, the latitude command, or the longitude command by causing the lateral propulsion controller to actuate the propeller based on at least one of the altitude command, the latitude command, or the longitude command.

In embodiments, the determining of the altitude command, the latitude command, and the longitude command is performed at least in part by determining, based on at least one of the location data or the wind data and an amount of power of the aerial vehicle that is associated with executing the altitude command, the latitude command, and the longitude command.

In another aspect, the present disclosure describes an aerial vehicle control method. The method includes obtaining location data corresponding to a location of the aerial vehicle; obtaining wind data from a wind data source; determining an altitude command, a latitude command, and a longitude command based on at least one of the location data or the wind data; causing an altitude controller of the aerial vehicle to implement at least one of the altitude command, the latitude command, or the longitude command; and causing a lateral propulsion controller of the aerial vehicle to implement at least one of the altitude command, the latitude command, or the longitude command.

In embodiments, method further includes obtaining a navigation command corresponding to at least one of a desired altitude of the aerial vehicle, a desired latitude coordinate of the aerial vehicle, or a desired longitude coordinate of the aerial vehicle, and the determining of the altitude command, the latitude command, and the longitude command is further based on the navigation command.

In embodiments, the altitude command is implemented by the altitude controller so that the aerial vehicle is positioned at the desired altitude, within a tolerance threshold, and the latitude command and the longitude command are implemented by the lateral propulsion controller so that the aerial vehicle is positioned at the desired latitude coordinate and the desired longitude coordinate, within a tolerance threshold.

In embodiments, the location data includes at least one of altitude data corresponding to an altitude of the aerial vehicle, latitude data corresponding to a latitude coordinate of the aerial vehicle, or longitude data corresponding to a longitude coordinate of the aerial vehicle, and the determining of the altitude command, the latitude command, and the longitude command is further based on at least one of the altitude data, the latitude data, or the longitude data.

In embodiments, the causing the altitude controller to implement at least one of the altitude command, the latitude command, or the longitude command includes transmitting, from a computing device to the aerial vehicle by way of a wireless communication link, the altitude command, the latitude command, and the longitude command, and the causing the lateral propulsion controller to implement at least one of the altitude command, the latitude command, or the longitude command includes transmitting, from the computing device to the aerial vehicle by way of the wireless communication link, the altitude command, the latitude command, and the longitude command.

In embodiments, the location data corresponding to the location of the aerial vehicle is obtained by the computing device from a sensor of the aerial vehicle by way of the wireless communication link.

In embodiments, the wind data corresponds to wind at or near at least one of the location of the aerial vehicle or the altitude of the aerial vehicle, and the wind data source includes at least one of a publicly available weather data source or a data source including data aggregated from a plurality of aerial vehicles.

In embodiments, the causing the altitude controller to implement at least one of the altitude command, the latitude command, or the longitude command includes causing the altitude controller to actuate an air-gas altitude control system of the aerial vehicle based on at least one of the altitude command, the latitude command, or the longitude command, and the causing the lateral propulsion controller to implement at least one of the altitude command, the latitude command, or the longitude command includes causing the lateral propulsion controller to actuate a propeller of the aerial vehicle based on at least one of the altitude command, the latitude command, or the longitude command.

In embodiments, the determining of the altitude command, the latitude command, and the longitude command is performed at least in part by determining, based on at least one of the location data or the wind data and an amount of power of the aerial vehicle that is associated with executing the altitude command, the latitude command, and the longitude command.

In another aspect, the present disclosure describes a computer-readable medium that has sequences of instructions stored thereon. The instructions, when executed by a processor, cause the processor to: obtain location data corresponding to a location of an aerial vehicle; obtain wind data from a wind data source; determine an altitude command, a latitude command, and a longitude command based on at least one of the location data or the wind data; cause an altitude controller of the aerial vehicle to implement at least one of the altitude command, the latitude command, or the longitude command; and cause a lateral propulsion controller of the aerial vehicle to implement at least one of the altitude command, the latitude command, or the longitude command.

BRIEF DESCRIPTION OF THE DRAWINGS

Various aspects and features of the present systems and methods for controlling an aerial vehicle are described herein below with references to the drawings, wherein.

DETAILED DESCRIPTION

The present disclosure is directed to systems and methods for controlling an aerial vehicle using a combination of vertical movement, for instance, by way of a buoyancy control mechanism (such as an air-gas altitude control system), and lateral propulsion, for instance, by way of a propeller. In one aspect, the systems and methods of the present disclosure enable an aerial vehicle to maintain its position within the air or to move to a new position in a cost-effective manner, without requiring a propulsion power at an airspeed that is at least equal in magnitude to that of the experienced wind speed, and in a manner that is not limited by wind characteristics, such as those associated with geographical zones or seasons. The systems and methods of the present disclosure, in some aspects, combine a vertical balloon-style movement with a relatively low-speed lateral propulsion, one or both of which are controlled based on aggregated data, such as wind data, aerial vehicle location data, and/or the like, to optimize the amount of power consumption. In some examples, the aerial vehicle control of the present disclosure applies relatively small lateral corrections to any remaining drift after a combined effect of vertical maneuvers.

Figure 1:
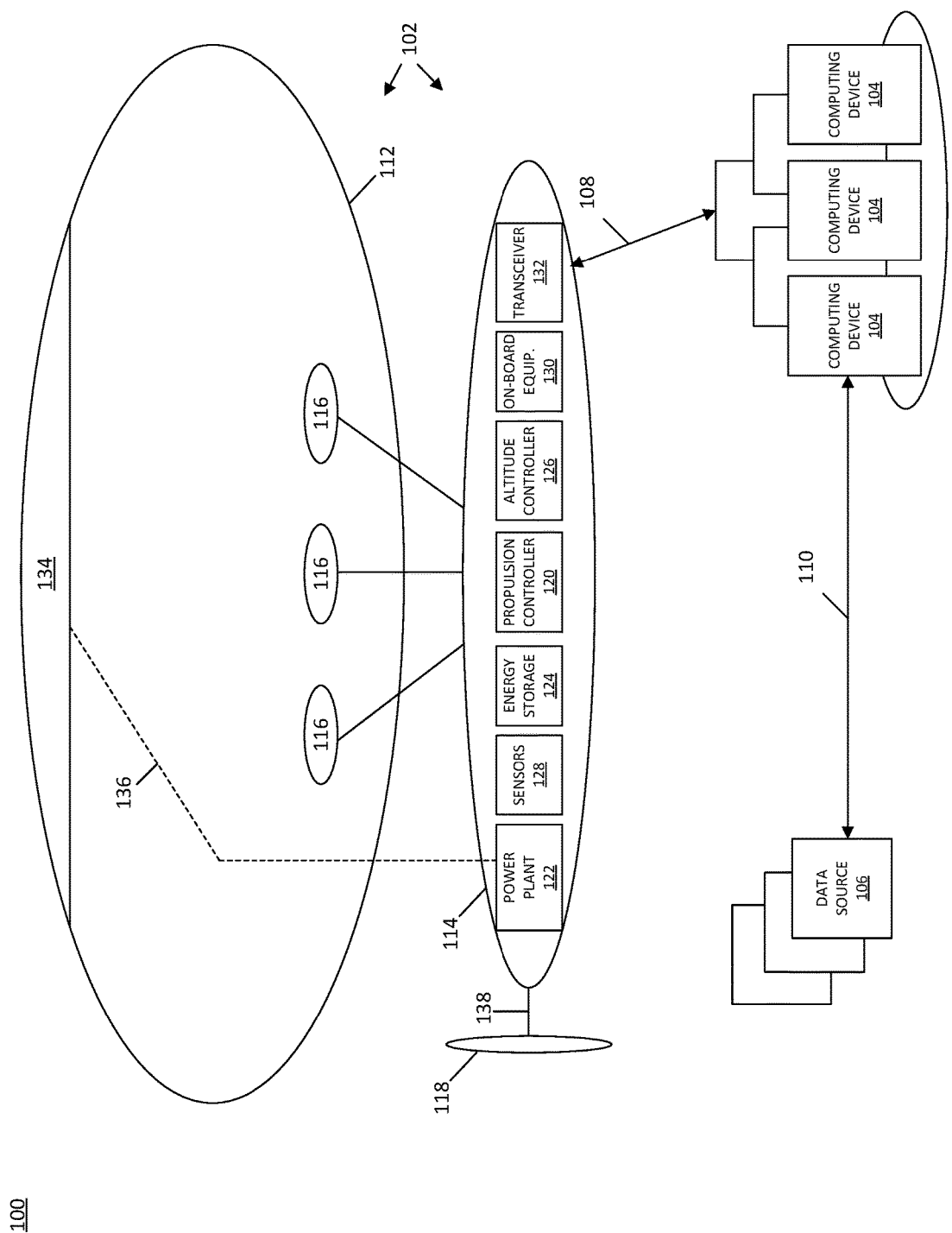
FIG. 1 is a schematic diagram of an illustrative aerial vehicle system, in accordance with an embodiment of the present disclosure.

With reference to FIG. 1, an illustrative aerial vehicle system 100 includes an aerial vehicle 102, one or more computing devices 104, and one or more data sources 106, not drawn to scale. The aerial vehicle 102 and the computing devices 104 are communicatively coupled to one another by way of a first wireless communication link 108, and the computing devices 104 and the data sources 106 are communicatively coupled to one another by way of a second wireless communication link 110. Although not separately shown in FIG. 1, the communication links 108 and/or 110 may include satellite links and/or other intervening devices, links, and/or networks. In some aspects, the aerial vehicle 102 is configured to be launched into and moved about the atmosphere, and the computing devices 104 cooperate as a ground-based distributed array to perform their functions described herein. The data sources 106 may include airborne data sources, such as airborne weather balloons, additional airborne aerial vehicles 102, satellite data sources, and/or the like, and/or ground-based data sources, such as publicly available and/or proprietary databases. Although the present disclosure is provided in the context of an embodiment where the system 100 includes multiple computing devices 104 and multiple data sources 106, in other embodiments the system 100 may include a single computing device 104 and a single data source 106. Further, although FIG. 1 shows a single aerial vehicle 102, in various embodiments the system 100 includes a fleet of multiple aerial vehicles 102 that are positioned at different locations throughout the atmosphere and that are configured to communicate with the computing devices 104, the data sources 106, and/or one another by way of the communication links 108 and/or 110.

In various embodiments, the aerial vehicle 102 may be configured to perform a variety of functions or provide a variety of services, such as, for instance, telecommunication services (e.g., long term evolution (LTE) service), hurricane monitoring services, ship tracking services, services relating to imaging, astronomy, radar, ecology, conservation, and/or other types of functions or services. In general, the systems and methods of the present disclosure provide techniques for controlling the position (also referred to as location) and/or movement of the aerial vehicles 102 throughout the atmosphere or beyond, to facilitate effective and efficient performance of their functions or provision of their services, as the case may be. As described in further detail herein, the computing devices 104 are configured to obtain a variety of types of data from a variety of sources and, based on the obtained data, communicate messages to the aerial vehicle 102 to control its position and/or movement during flight.

With continued reference to FIG. 1, the aerial vehicle 102 includes an outer envelope 112 and a gondola 114, which is suspended beneath the outer envelope 112 while the aerial vehicle 102 is in flight. The outer envelope 112 includes one or more ballonets 116 which, as described in further detail below, are used to control the buoyancy, and in turn the altitude, of the aerial vehicle 102 in flight. In some aspects, the ballonets 116 include air and the outer envelope 112 includes a lifting gas that is lighter than air. The altitude controller 126 controls a pump and a valve (neither of which is shown in FIG. 1) to pump air into the ballonets 116 (from air outside the aerial vehicle 102) to increase the mass of the aerial vehicle 102 and lower its altitude, or to release air from the ballonets 116 (into the atmosphere outside the aerial vehicle 102) to decrease the mass of the aerial vehicle 102 and increase its altitude. The combination of the altitude controller 126, the outer envelope 112, the ballonets 116, and the valves and pumps (not shown in FIG. 1) may be referred to as an air-gas altitude control system, however other types of buoyancy control mechanisms are contemplated as well.

The outer envelope 112 also has one or more solar panels 134 affixed to its upper portion that absorb sunlight, when available, and generate electrical energy from the absorbed sunlight. The solar panels 134 provide, by way of power paths such as power path 136, the generated electrical energy to the various components of the aerial vehicle 102, such as components housed within the gondola 114, for utilization during flight.

The gondola 114 includes a variety of components, some of which may or may not be included, depending upon the application and/or needs. Although not expressly shown in FIG. 1, the various components of the aerial vehicle 102 in general, and/or of the gondola 114 in particular, may be coupled to one another for communication of power, data, and/or other signals or information. The example gondola 114 shown in FIG. 1 includes a propulsion controller 120, one or more sensors 128, an energy storage module 124, a power plant 122, an altitude controller 126, a transceiver 132, and other on-board equipment 130. The transceiver 132 is configured to wirelessly communicate data between the aerial vehicle 132 and the computing devices 104 and/or data sources 106 by way of the wireless communication link 108 and/or the communication link 110, respectively.

The gondola 114 also has a propeller 118 affixed to either of its ends by way of an articulable arm member 138. The propulsion controller 120 controls the propeller 118 to provide propulsion, such as lateral propulsion, to propel the aerial vehicle 102 to assist in controlling its position and/or movement during flight. As described below in further detail, in various embodiments the propulsion controller 120 is configured to control the propeller 118 based at least in part upon a propulsion command that is generated by, and received from, the computing devices 104 by way of the wireless communication link 108 and the transceiver 132. In some aspects, the propulsion controller 120 implements the propulsion command by causing the actuation of the propeller 118 based on the propulsion command. The configuration of the propeller 118 and the articulable arm member 138 shown in FIG. 1 is provided by way of example and not limitation. Other configurations of propulsion are contemplated. For instance, in other embodiments, the aerial vehicle 102 may include multiple propellers 118 affixed to corresponding portions of the gondola 114, or may include an arm member that is inarticulable in contrast to the articulable arm member 138, or may include alternative methods of propulsion known in the art. The propeller 118 and/or the articulable arm member 138 may be employed to propel the aerial vehicle 102 in a lateral direction (in which case, the propulsion controller 120 may be referred to as a lateral propulsion controller) and/or in a vertical direction.

In some embodiments, the sensors 128 include a global position satellite (GPS) sensor that senses and outputs location data, such as latitude, longitude, and/or altitude data corresponding to a latitude, longitude, and/or altitude of the aerial vehicle 102 in the earth's atmosphere. The sensors 128 are configured to provide the location data to the computing devices 104 by way of the wireless transceiver 132 and the wireless communication link 108 for use in controlling the aerial vehicle 102, as described in further detail below.

The energy storage module 124 includes one or more batteries or one or more other energy storage devices, such as one or more fuel cells, that store electrical energy provided by the solar panels 134 for use by the various components of the aerial vehicle 102. The power plant 122 obtains electrical energy stored by the energy storage module 124 and converts and/or conditions the electrical energy to a form suitable for use by the various components of the aerial vehicle 102. In some embodiments, the power plant 122 also includes one or more motors (not shown in FIG. 1) configured to drive the propeller 118.

The altitude controller 126 is configured to control the ballonets 116 to adjust the buoyancy of the aerial vehicle 102 to assist in controlling its position and/or movement during flight. As described below in further detail, in various embodiments the altitude controller 126 is configured to control the ballonets 116 based at least in part upon an altitude command that is generated by, and received from, the computing devices 104 by way of the wireless communication link 108 and the transceiver 132. In some examples, the altitude controller 126 is configured to implement the altitude command by causing the actuation of the air-gas altitude control system based on the altitude command.

The on-board equipment 130 may include a variety of types of equipment, depending upon the application or needs, as outlined above. For example, the on-board equipment 130 may include LTE transmitters and/or receivers, weather sensors, imaging equipment, and/or any other suitable type of equipment.

Figure 2:
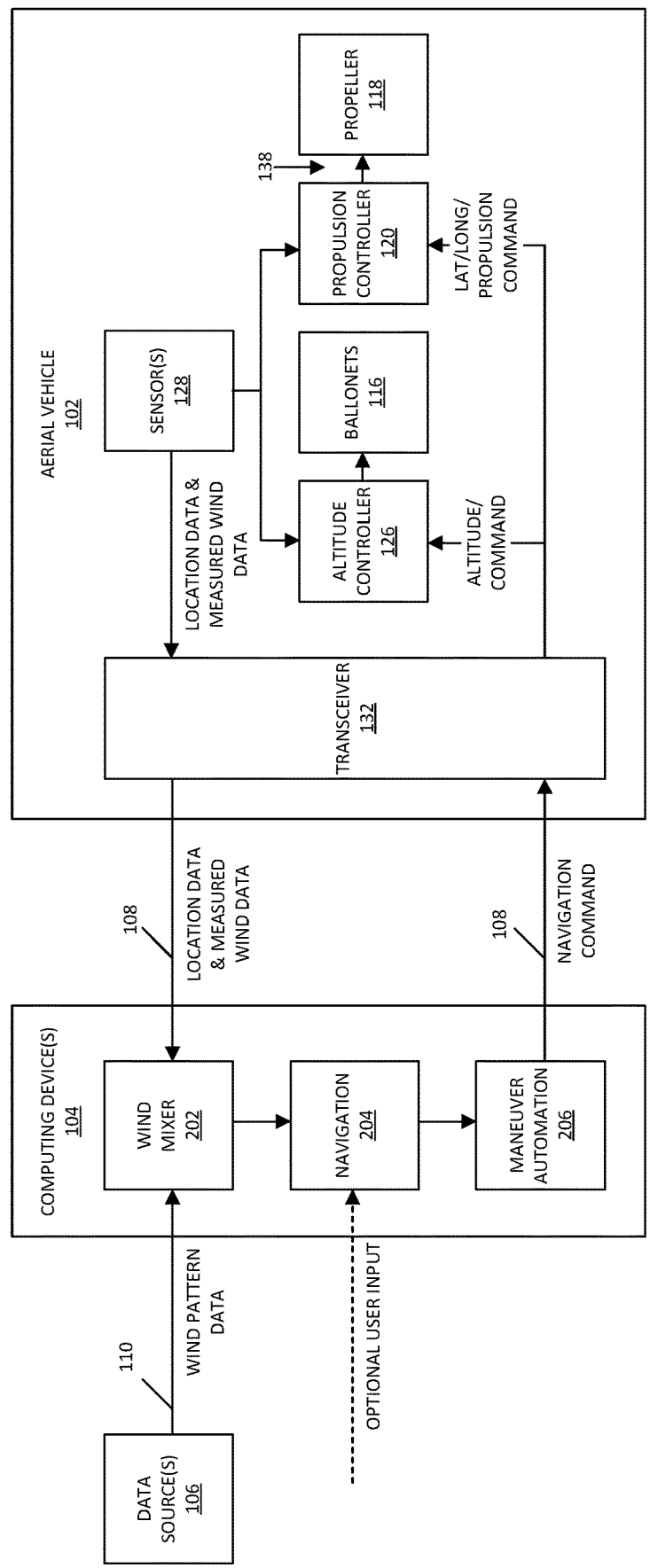
FIG. 2 is a schematic diagram showing additional aspects of the aerial vehicle system of FIG. 1, in accordance with an embodiment of the present disclosure.
Figure 4:
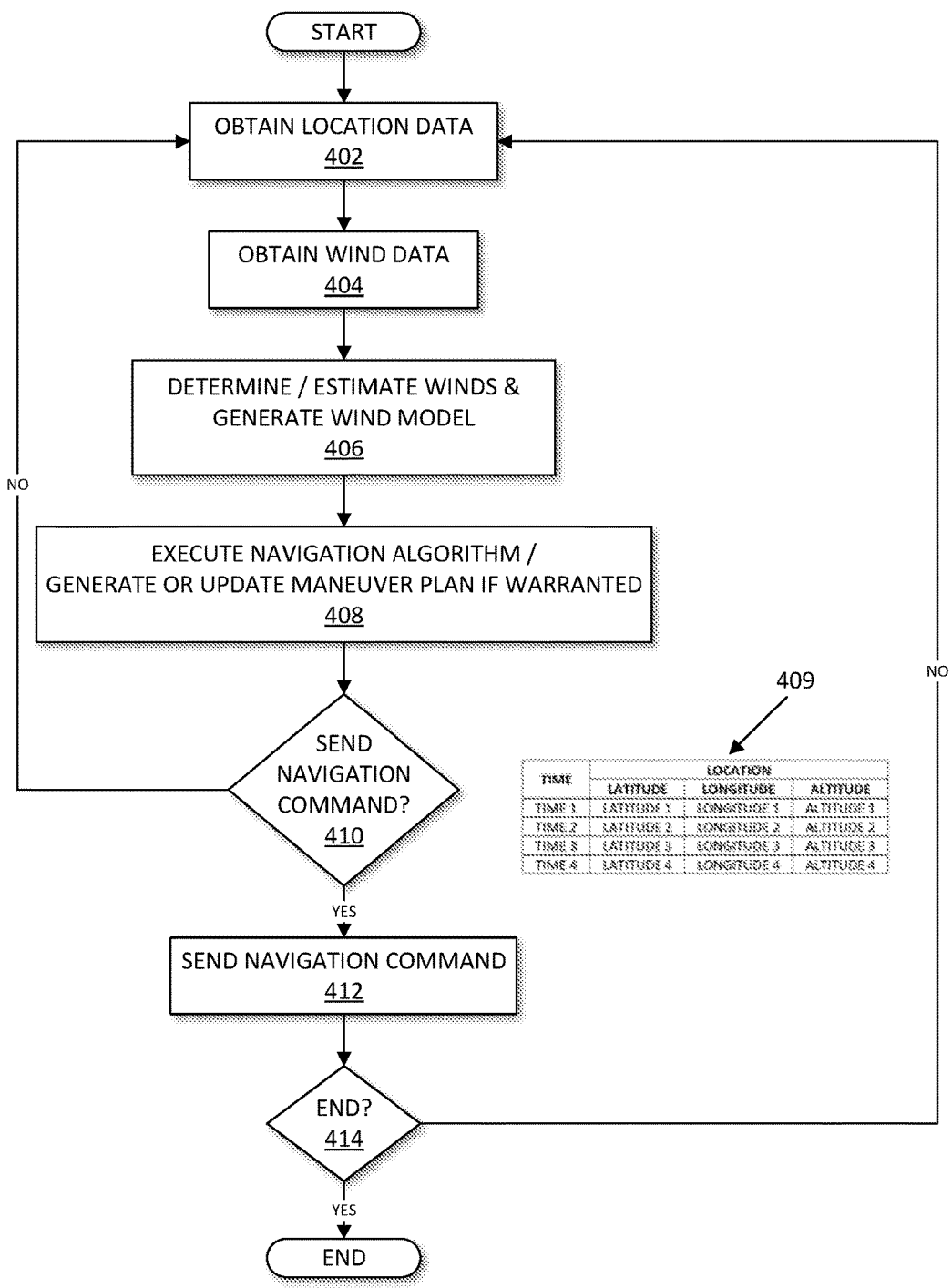
FIG. 4 is a flowchart showing an illustrative method for controlling an aerial vehicle from the perspective of a computing device of FIG. 1, in accordance with an embodiment of the present disclosure.

Having provided an overview of the aerial vehicle system 100 in the context of FIG. 1, reference is now made to FIG. 2, which shows certain portions of the aerial vehicle system 100, in accordance with an embodiment of the present disclosure. In particular, FIG. 2 illustrates an example embodiment of how functionality and corresponding components are allocated among the aerial vehicle 102, the computing devices 104, and/or the data sources 106, to control a position and/or movement of the aerial vehicle 102. Although more detailed aspects of how the system 100 implements control of the aerial vehicle 102 are provided below in the context of FIG. 4, FIG. 2 provides an overview of the functionality and component allocation. The arrangement of components depicted in FIG. 2 is provided by way of example and not limitation. Other arrangements of components and allocations of functionality are contemplated, for instance, with the aerial vehicle 102 including components that implement functionality shown in FIG. 2 as being implemented by the computing devices 104, or vice versa. However, in the example shown in FIG. 2, a majority of components and functionality are allocated to the computing devices 104 instead of to the aerial vehicle 102, which decreases the amount of energy required to operate the components of the aerial vehicle 102 and thus enables the components of the aerial vehicle 102 to utilize a greater portion of the available energy than would be possible if more components and functionality were allocated to the aerial vehicle 102. This increases the capabilities of the aerial vehicle 102 for implementing functionality and/or providing services for a given amount of available energy.

In addition to certain components that were introduced above in connection with FIG. 1, FIG. 2 shows a wind mixer module 202, a navigation module 204, and a maneuver automation module 206 that are included within the computing devices 104. Once the aerial vehicle 102 is in flight in the atmosphere, the sensors 128 are configured to periodically transmit to the wind mixer module 202, by way of the transceiver 132 and the wireless communication link 108, location data, such as timestamped GPS positions of the aerial vehicle 102 at corresponding times, and measured wind data. The wind mixer module 202 utilizes the location data and measured wind data obtained from the sensors 128 and, in some instances, wind pattern data obtained from other data sources 106 (such as National Oceanic and Atmospheric Administration (NOAA) data sources, European Centre for Medium-Range Weather Forecasts (ECMWF) data sources, and/or the like) to infer or estimate the winds in which the aerial vehicle 102 is flying or is expected to be flying. In particular, wind points are stored in the wind mixer module 202, which constructs a kernel function, such as a Gaussian Process kernel function that assists the navigation module 204 in determining how to navigate the aerial vehicle 102 based on the inferred or estimated winds, according to one or more predetermined navigation algorithms. Examples of types of navigation algorithms that may be implemented by the navigation module 204 are described in U.S. patent application Ser. Nos. 15/662,940; 15/662,968; 15/663,000; and 15/663,030; each entitled SYSTEMS AND METHODS FOR CONTROLLING AERIAL VEHICLES and each filed on Jul. 28, 2017; and in U.S. patent application Ser. No. 15/663,117, entitled SYSTEM AND METHODS FOR SIMULATING WIND NOISE MODELS and filed on Jul. 28, 2017, each application of which is hereby incorporated by reference herein in its entirety. For instance, aerial vehicles may travel at very high altitudes, including up to approximately 20 kilometers above the Earth's surface in the stratosphere, which is well above the altitudes of airplanes, wildlife, and weather events. In the stratosphere, winds are stratified, and each layer of wind may vary in speed and/or direction. The aerial vehicles may be moved using such winds, and a direction and/or speed of movement of the aerial vehicles may be controlled based on the winds in the various layers of the stratosphere. However, reliance on predicted weather data alone may be undesirable in planning and/or controlling flight paths of the aerial vehicles, because predicted weather data may be locally inaccurate and/or outdated. Thus, planning a flight path or course of an aerial vehicle may be based on prevailing wind patterns, and seeking an optimal altitude for the aerial vehicle to move along a desired heading and/or at a desired speed, based on uncertainty in the prevailing wind patterns. Depending upon the navigation algorithm being implemented, the navigation module 204 generates a maneuver plan, which includes one or more navigation commands that define how the aerial vehicle 102 is to move or remain stationary, and registers the maneuver plan with the maneuver automation module 206.

In various embodiments, the navigation module 204 may generate various types of maneuver plans that include various types of navigation commands. For example, a coordinate-based maneuver plan may include one or more coordinate-based navigation commands, and a vector-based maneuver plan may include one or more vector-based navigation commands. In particular, a coordinate-based maneuver plan may include as a coordinate-based navigation command an item of location data that defines a location that the aerial vehicle 102 should attempt to attain and/or maintain. The item of location data of the coordinate-based navigation command may include two subcomponents: (1) a vertical navigation command, which defines a vertical geographical position or altitude that the aerial vehicle 102 should attempt to attain and/or maintain and which may be represented by a barometric pressure, and (2) a horizontal navigation command, which may be a combination of a latitude coordinate and a longitude coordinate and which defines a horizontal geographic position (e.g., latitude coordinate and a longitude coordinate) that the aerial vehicle 102 should attempt to attain and/or maintain. As described further herein, in some embodiments, based upon the vertical navigation command and/or horizontal navigation command received from the computing devices 104, the aerial vehicle 102 generates an appropriate altitude command and/or propulsion command by which the altitude controller 126 and propulsion controller 120 are actuated to effect the overall navigation command or maneuver plan. In other embodiments, for instance as described in connection with FIG. 4 and FIG. 5, the computing device 104 generates the appropriate altitude command and/or propulsion command and communicates the altitude command and/or propulsion command to the aerial vehicle 102 as the navigation command.

A vector-based maneuver plan may include as a vector-based navigation command an item of navigational vector data which includes a directional navigation command and a velocity navigation command (or a force command, an acceleration command, or any other type of magnitude-based command). The directional navigation command defines a direction in which the aerial vehicle 102 should attempt to move and the velocity navigation command (or other magnitude-based command) defines a velocity (or force, acceleration, or other magnitude) at which the aerial vehicle 102 should attempt to move in the defined direction. The directional navigation command may be defined as a combination of a cardinal-based direction and/or an elevational direction (e.g., north, south, east, west, elevate, descend, and/or the like), or may be defined in terms of any reference coordinate system. The directional navigation command may include two subcomponents: (1) a vertical navigation command that defines how the aerial vehicle 102 should move, if at all, in a vertical direction (e.g., ascend, descend, or maintain current altitude) and (2) a horizontal navigation command that defines how the aerial vehicle 102 should move, if at all, in a horizontal direction (e.g., north, south, east, west, and/or the like). As described further herein, in some embodiments, based upon the vertical navigation command and/or horizontal navigation command received from the computing devices 104, the aerial vehicle 102 generates an appropriate altitude command and/or propulsion command by which the altitude controller 126 and propulsion controller 120 are actuated to effect the overall navigation command or maneuver plan. In other embodiments, for instance as described in connection with FIG. 4 and FIG. 5, the computing device 104 generates the appropriate altitude command and/or propulsion command and communicates the altitude command and/or propulsion command to the aerial vehicle 102 as the navigation command.

Additionally, the maneuver plan may include a single navigation command (e.g., a single item of location data or a single item of navigational vector data) that defines a single position or motion (e.g., a single geographical location or a single direction and velocity pair) that the aerial vehicle 102 should attempt to attain or maintain until instructed otherwise. Alternatively, or additionally, the maneuver plan may be time-based and include multiple navigation commands (e.g., multiple items of location data or multiple items of navigational vector data) that define multiple positions or motions (e.g., a series of locations or a series of direction and velocity pairs) that the aerial vehicle 102 should attempt to attain or maintain at corresponding times. In some embodiments the time-based maneuver plan may be represented as a table stored in a memory of the computing devices 104 and/or communicated to the aerial vehicle 102.

The maneuver automation module 206 sequentially transfers the generated maneuver plan, or more specifically, the one or more navigation commands (e.g., coordinate-based navigation commands or vector-based navigation commands) that are included in the maneuver plan, to the altitude controller 126 and/or the propulsion controller 120 for implementation. In particular, in one example for a coordinate-based maneuver plan, the maneuver automation module 206 transmits to the transceiver 132, by way of the wireless communication link 108, an altitude command (for example, which may be specified as a barometric pressure, which may be equivalent to pressure altitude, and which indicates a desired altitude for the aerial vehicle 102 to maintain within some tolerance band) and a propulsion command (for example, which indicates a desired propulsion amount and/or direction for the aerial vehicle 102 to maintain within some tolerance band). The altitude controller 126 and the propulsion controller 120 are configured to execute altitude and propulsion loops, respectively, whereby the altitude controller 126 and the propulsion controller 120 periodically receive the altitude command and the propulsion command from the computing devices 104, and execute those commands to control the position (e.g., latitude, longitude, altitude) and/or movement of the aerial vehicle 102.

Figure 5:
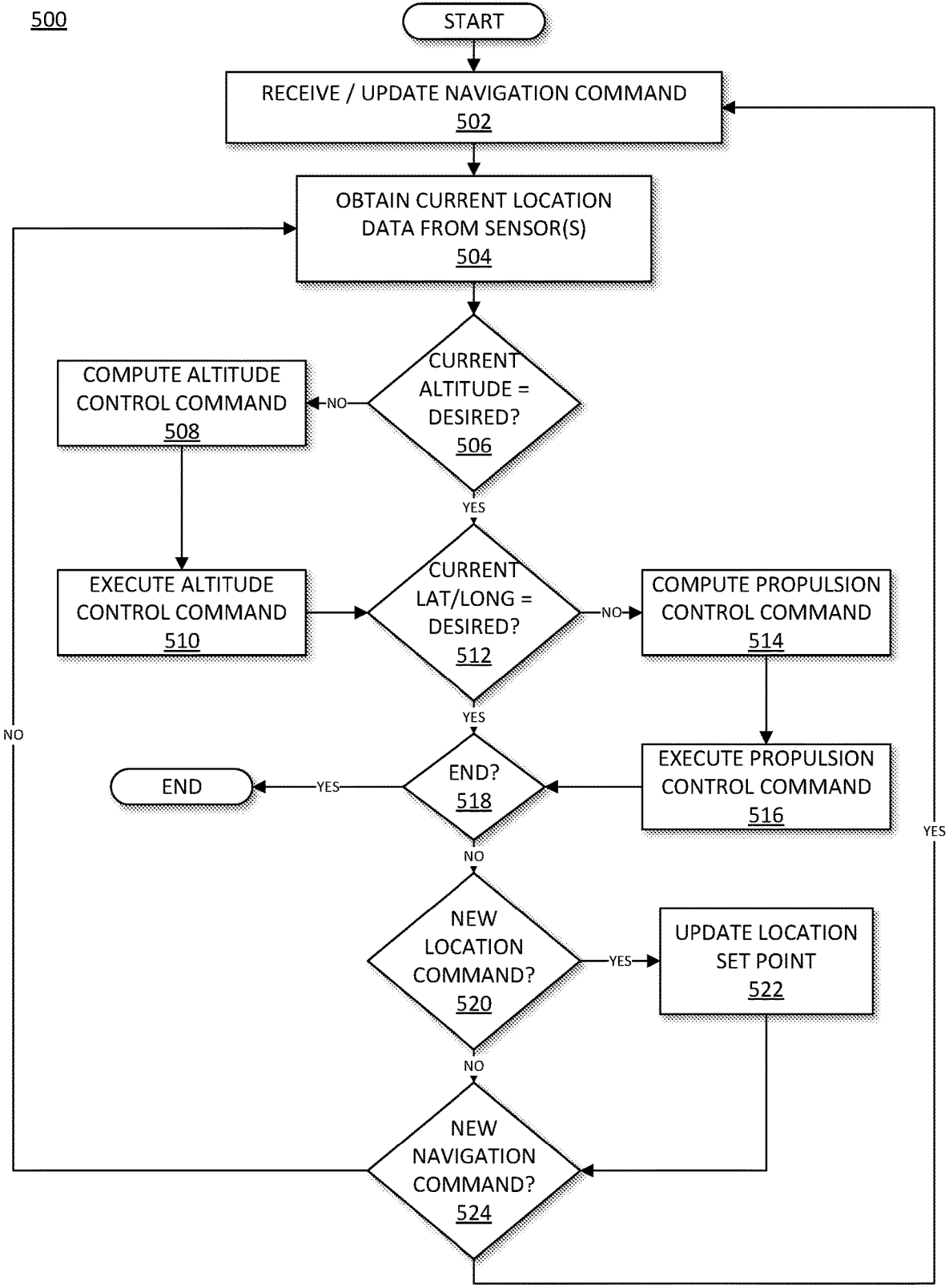
FIG. 5 is a flowchart showing an illustrative method for controlling an aerial vehicle from the perspective of the aerial vehicle of FIG. 1, in accordance with an embodiment of the present disclosure.

In various embodiments, a feedback loop may be implemented in a variety of ways in an effort to ensure that the aerial vehicle 102 attaining or maintaining the desired location and/or movement according to the maneuver plan. For example, in some embodiments, the aerial vehicle 102 is configured to actuate its altitude controller 126 and/or propulsion controller 120 based on the navigation command(s) received from the computing devices 104 and provide feedback, such as location data, to the computing devices 104. The computing devices 104 use the location data feedback to verify that the aerial vehicle 102 is attaining or maintaining the desired location and/or movement according to the maneuver plan, and, if necessary, adjust the maneuver plan accordingly and communicate updated navigation commands to the aerial vehicle 102 for implementation. In other embodiments, for instance as illustrated in FIG. 5 (described below), the aerial vehicle 102 is configured to analyze location data from its sensors 128 to ensure that the aerial vehicle 102 attaining or maintaining the desired location and/or movement according to the maneuver plan and, if necessary, adjust the actuation of its altitude controller 126 and/or its propulsion controller 120 accordingly.

Figure 3:
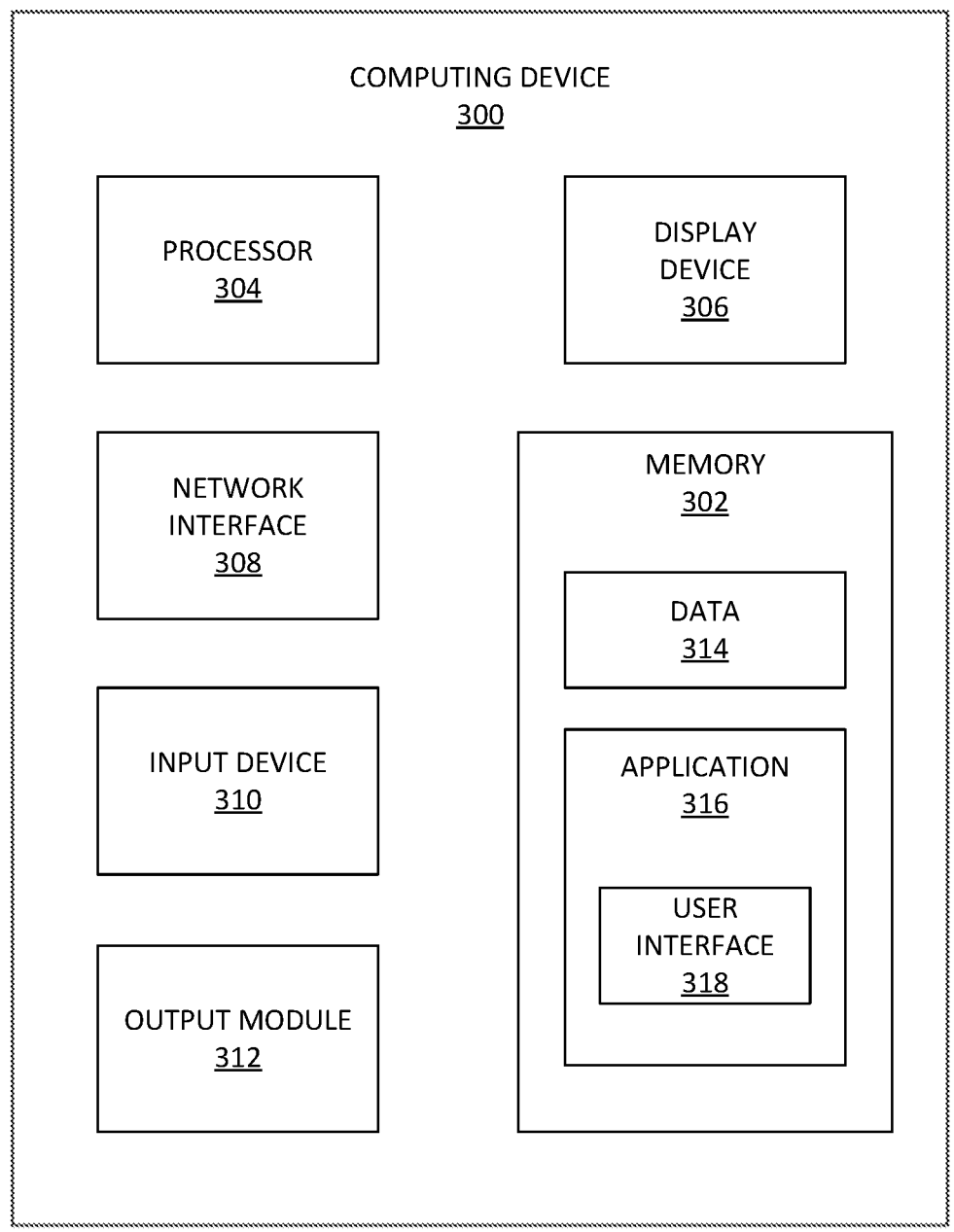
FIG. 3 is a schematic block diagram of an illustrative embodiment of a computing device that may be employed in various embodiments of the present system, for instance, as part of the system or components of FIG. 1 or 2, in accordance with an embodiment of the present disclosure.

FIG. 3 is a schematic block diagram of a computing device 300 that may be employed in accordance with various embodiments herein. Although not explicitly shown in FIG. 1 or FIG. 2, in some embodiments, the computing device 300, or one or more of the components thereof, may further represent one or more components (e.g., the computing device 104, components of the gondola 114, the data sources 106, and/or the like) of the system 100. The computing device 300 may, in various embodiments, include one or more memories 302, processors 304, display devices 306, network interfaces 308, input devices 310, and/or output modules 312. The memory 302 includes non-transitory computer-readable storage media for storing data and/or software that is executable by the processor 304 and which controls the operation of the computing device 300. In embodiments, the memory 302 may include one or more solid-state storage devices such as flash memory chips. Alternatively, or in addition to the one or more solid-state storage devices, the memory 302 may include one or more mass storage devices connected to the processor 304 through a mass storage controller (not shown in FIG. 3) and a communications bus (not shown in FIG. 3). Although the description of computer readable media contained herein refers to a solid-state storage, it should be appreciated by those skilled in the art that computer-readable storage media can be any available media that can be accessed by the processor 304. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which can be used to store the desired information and which can be accessed by computing device 300.

In some embodiments, the memory 302 stores data 314 and/or an application 316. In some aspects the application 316 includes a user interface component 318 that, when executed by the processor 304, causes the display device 306 to present a user interface (not shown in FIG. 3). The network interface 308, in some embodiments, is configured to couple the computing device 300 and/or individual components thereof to a network, such as a wired network, a wireless network, a local area network (LAN), a wide area network (WAN), a wireless mobile network, a Bluetooth network, the Internet, and/or another type of network. The input device 310 may be any device by means of which a user may interact with the computing device 300. Examples of the input device 310 include without limitation a mouse, a keyboard, a touch screen, a voice interface, and/or the like. The output module 312 may, in various embodiments, include any connectivity port or bus, such as, for example, a parallel port, a serial port, a universal serial bus (USB), or any other similar connectivity port known to those skilled in the art.

FIG. 4 is a flowchart showing an illustrative method 400 for controlling an aerial vehicle from the perspective of the computing devices 104 of the system 100, in accordance with an embodiment of the present disclosure. At block 402, the wind mixer module 202 obtains, from the sensors 128 of the aerial vehicle 102 by way of the transceiver 132 and the wireless communication link 108, location data that is periodically transmitted by the aerial vehicle 102. The location data is timestamped and indicates a location, such as a latitude coordinate, a longitude coordinate, and/or an altitude of the aerial vehicle 102 at a corresponding time.

At block 404, the wind mixer module 202 obtains wind data, such as wind pattern data, from a variety of sources, such as the data sources 106, sensors 128 of the aerial vehicle 102, sensors 128 of other aerial vehicle 102 that are airborne, or were previously airborne, and/or the like. At block 406, the wind mixer module 202 utilizes the location data obtained at block 402 from the sensors 128 and the wind data obtained at block 404 from the data sources 106 to determine or estimate the winds in which the aerial vehicle 102 is flying or is expected to be flying. Based on the determined or estimated winds, the wind mixer module 202 constructs a wind model (e.g., including a kernel function as described above), and forwards the wind model to the navigation module 204.

At block 408, the navigation module 204 uses the wind model provided at block 406 to determine how to navigate the aerial vehicle 102, in view of the determined and/or estimated winds, according to one or more predetermined navigation algorithms, as described above. Based upon the particular navigation algorithm being implemented, the navigation module 204 generates a maneuver plan, which, in some embodiments, indicates one or more locations (e.g., altitudes, latitude coordinates, and/or longitude coordinates) that the aerial vehicle 102 should attempt to attain or maintain at corresponding times, in accordance with the navigation algorithm. The maneuver plan, in some instances, may take the form of a table, such as the table 409 shown in FIG. 4 that matches times with corresponding locations. If a prior maneuver plan has already been generated prior to the instant iteration of block 408, then at block 408, the navigation module 204 determines whether the maneuver plan is to be updated based on new or updated data, such as location data obtained at block 402 and/or wind data obtained at block 404. The navigation module 204 registers the generated or updated maneuver plan with the maneuver automation module 206 for implementation.

At block 410, the maneuver automation module 206 determines whether a navigation command is to be transmitted to the aerial vehicle 102, based on the navigation algorithm executed at block 408. A navigation command may take a variety of forms as described above, and in some embodiments includes location data that indicates to the aerial vehicle 102 one or more desired locations (e.g., latitude coordinates, longitude coordinates, and/or altitudes) that the aerial vehicle 102 is to attempt to attain or maintain at one or more corresponding times. The navigation command may include a single location that the aerial vehicle 102 is to attempt to attain immediately upon receipt, or the navigation command may include multiple times and corresponding locations that the aerial vehicle 102 is to attempt to attain or maintain at those times. In some instances, the navigation command may include the maneuver plan table 409 generated at block 408. In various embodiments, the maneuver automation module 206 may transmit navigation command items sequentially one at a time or may transmit navigation command items in a batch, such as by way of the maneuver plan table 409. The determination at block 410 as to whether the maneuver automation module 206 is to transmit the navigation command to the aerial vehicle 102 may be based on whether the maneuver plan generated at block 408 is new or has already been provided to the aerial vehicle 102 as the navigation command. If the maneuver plan generated at block 408 is new and has not been provided to the aerial vehicle 102, then it may be determined at block 410 that the maneuver automation module 206 is to transmit the plan location data (e.g., the maneuver plan table) to the aerial vehicle 102. If the maneuver plan generated at block 408 is not new and has already been provided to the aerial vehicle 102, then it may be determined at block 410 that the maneuver automation module 206 is not to transmit the navigation command to the aerial vehicle 102. If the maneuver automation module 206 determines at block 410 not to transmit the navigation command to the aerial vehicle 102 ("NO" at block 410), then control passes back to block 402 to obtain additional or more up-to-date location data as described above. If the maneuver automation module 206 determines at block 410 to transmit the navigation command to the aerial vehicle 102 ("YES" at block 410), then control block 412.

At block 412, the maneuver automation module 206 transmits the navigation command to the aerial vehicle 102, particularly the altitude controller 126 and/or propulsion controller 120 thereof, by way of the wireless communication link 108 and the transceiver 132, in one or more of the manners described above, for implementation according to the maneuver plan generated at block 408. In particular, the maneuver automation module 206 transmits to the transceiver 132, by way of the wireless communication link 108, an altitude command (for example, which may be specified as a barometric pressure, which may be equivalent to pressure altitude, and which indicates a desired altitude for the aerial vehicle 102 to maintain within some tolerance band), a latitude command (for example, which may indicate a desired latitude coordinate), and/or a longitude command (for example, which may indicate a desired longitude coordinate) for the aerial vehicle 102 to attain or maintain within some tolerance band. In some embodiments, in lieu of specifying a location (e.g., altitude, latitude, and longitude), the maneuver automation module 206 specifies to the aerial vehicle 102 a desired vector or direction of travel in the atmosphere.

As described in further detail below in connection with FIG. 5, in some embodiments, the altitude controller 126 and the propulsion controller 120 are configured to execute altitude and propulsion loops, respectively, whereby the altitude controller 126 and the propulsion controller 120 periodically receive the altitude command and the propulsion command from the computing devices 104, and execute those commands to control the position (e.g., latitude, longitude, altitude) and/or movement of the aerial vehicle 102. Although the altitude controller 126 is generally employed to control the altitude of the aerial vehicle 102 and the propulsion controller 120 is generally employed to control the latitude and longitude coordinates of the aerial vehicle 102, in some embodiments, the altitude controller 126 may also or alternatively be employed to control the latitude and/or longitude coordinates of the aerial vehicle 102 (for instance, by using wind data from the data sources 106 to identify an altitude with a more favorable wind direction and causing the aerial vehicle 102 to move to the identified altitude), and the propulsion controller 120 may also or alternatively be employed to control the altitude of the aerial vehicle 102. In further embodiments, the altitude controller 126 and the propulsion controller 120 may be configured to cooperate with one another to control any one or any combination of the altitude, latitude coordinate, or longitude coordinate of the aerial vehicle 102.

At block 414, a determination is made as to whether to terminate control of the aerial vehicle 102, for instance, based on whether the aerial vehicle 102 remains in flight and/or based on a mode of operation of the aerial vehicle 102. If it is determined at block 414 to terminate control of the aerial vehicle 102 ("YES" at block 414), then the procedure 400 terminates. If it is determined at block 414 not to terminate control of the aerial vehicle 102 ("NO" at block 414), then control passes back to block 402 to obtain additional or more up-to-date location data as described above.

FIG. 5 is a flowchart showing an illustrative method 500 for controlling an aerial vehicle, from the perspective of the aerial vehicle 102, in accordance with an embodiment of the present disclosure. At block 502, the aerial vehicle 102 receives, by way of the wireless communication link 108 and the transceiver 132, the navigation command transmitted (FIG. 4, block 412) by the computing device 104. The aerial vehicle 102 periodically receives multiple transmissions of navigation commands from the computing device 104, as described above. If, at the time of receiving the navigation command at the present instance of block 502, the aerial vehicle 102 has already received a navigation command at a prior instance of block 502, then at the present instance of block 502, the aerial vehicle 102 may overwrite the prior navigation command with the more recently received and up-to-date navigation command.

At block 504, the altitude controller 126 and/or the propulsion controller 120 obtain from the sensors 128 location data, such as altitude data, latitude data, and/or longitude data indicating a current altitude, latitude coordinate, and/or longitude coordinate, respectively, of the aerial vehicle 102. As described above, the altitude controller 126 and the propulsion controller 120, in various embodiments, may separately control the altitude, latitude, and longitude coordinates or may cooperate to control the altitude, latitude and longitude coordinates. In this regard, the altitude controller 126 and the propulsion controller 120 may obtain from the sensors 128 at block 504 whichever types of location data may require for processing. In some embodiments, at block 504, the altitude controller 126 obtains altitude data from the sensors 128, and the propulsion controller 120 obtains latitude data and longitude data from the sensors 128.

At block 506, the altitude controller 126 (or the propulsion controller 120, as the case may be) compares the current altitude, as obtained from the sensors 128 at block 504, to the desired altitude, as dictated based on the navigation command that was obtained at block 502 and the current time, to determine whether any adjustment to altitude is needed. If the altitude controller 126 determines at block 506 that the current altitude matches the desired altitude, within a tolerance band ("YES" at block 506), then control passes to block 512. If the altitude controller 126 determines at block 506 that the current altitude does not match the desired altitude, within the tolerance band ("NO" at block 506), then control passes to block 508.

At block 508, the altitude controller 126 computes an altitude command to provide to the ballonets 116 in an effort to move the aerial vehicle 102 throughout the atmosphere from the current altitude to the desired altitude. At block 510, the altitude controller 126 provides the altitude command to the ballonets 116 to cause the aerial vehicle 102 to attempt to attain and/or maintain the desired altitude.

At block 512, the propulsion controller 120 (or the altitude controller 126, as the case may be) compares the current latitude and longitude coordinates, as obtained from the sensors 128 at block 504, to the desired latitude and longitude coordinates, as dictated based on the navigation command that was obtained at block 502 and the current time, to determine whether any adjustment to the latitude and/or longitude coordinates of the aerial vehicle 102 is needed. If the propulsion controller 120 determines at block 512 that the current latitude and longitude match the desired latitude and longitude, within a tolerance band ("YES" at block 512), then control passes to block 518. If the propulsion controller 120 determines at block 512 that the current latitude and/or longitude does not match the desired latitude and/or longitude, within the tolerance band ("NO" at block 512), then control passes to block 514.

At block 514, the propulsion controller 120 computes a propulsion command to provide to the propeller 130 and/or the articulable arm member 138 in an effort to move the aerial vehicle 102 throughout the atmosphere from the current latitude and/or longitude to the desired latitude and/or longitude. At block 516, the propulsion controller 120 provides the propulsion command to the propeller 130 and/or the articulable arm member 138 to cause the aerial vehicle 102 to attempt to attain and/or maintain the desired latitude and/or longitude. The propulsion control command may include an amount of propulsion for the propeller 130 to provide, a direction in which the propeller 130 and/or the articulable arm member 138 are to propel the aerial vehicle 102, and/or the like.

At block 518, a determination is made as to whether to terminate control of the aerial vehicle 102, for instance, based on whether the aerial vehicle 102 remains in flight and/or based on a mode of operation of the aerial vehicle 102. If it is determined at block 518 to terminate control of the aerial vehicle 102 ("YES" at block 518), then the procedure 500 terminates. If it is determined at block 518 not to terminate control of the aerial vehicle 102 ("NO" at block 518), then control passes back to block 520.

At block 520, a determination is made as to whether new location command (for example, a new altitude command, latitude control command, and/or longitude control command) is to be provided to the altitude controller 126 and/or the propulsion controller 130 adjust the altitude, latitude, and/or longitude coordinates of the aerial vehicle 102, according to the navigation command that was obtained at block 502. The determination at block 520 may be based upon comparing the current time to the corresponding times listed in the navigation command (e.g., maneuver plan table 409, FIG. 4) to determine whether it is time to move the aerial vehicle 102 to a new location or maintain the aerial vehicle 102 at its current location obtained at block 504. If it is determined at block 520 that a new location command is to be provided ("YES" at block 520), then at block 522, a location set point is updated to reflect the new desired altitude, desired latitude coordinate, and/or desired longitude coordinate.

At block 524, a determination is made as to whether a new navigation command has been received from the computing device 104, for instance, to update the maneuver plan based on a change in conditions, such as wind data or other weather data, or based on a user input. If it is determined at block 524 that a new navigation command has been received ("YES" at block 524), then control passes back to block 502 to update or overwrite the navigation command (e.g., maneuver plan table 409, FIG. 4) that was received at a prior instance of block 502 with the navigation command that was received at the most recent instance of block 502. If it is determined at block 524 that no new navigation command has been received ("NO" at block 524), then control passes back to block 504 to obtain new or more up-to-date current location data of the aerial vehicle 102 in an effort to continue to cause the aerial vehicle 102 to attain or maintain the desired altitude, latitude coordinate, and longitude coordinate in the atmosphere.

The embodiments disclosed herein are examples of the present systems and methods and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but are not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present systems and methods. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An aerial vehicle control system for controlling one or more lighter-than-air vehicles, the control system comprising:

memory configured to store location data and environmental data, the location data corresponding to locations of the one or more lighter-than-air vehicles, and the environmental data including wind data; and one or more processors operatively coupled to the memory, the one or more processors being configured to:

obtain the location data corresponding to a location of a given one of the one or more lighter-than-air vehicles;

obtain the wind data associated with the given lighter-than-air vehicle;

identify, based on the obtained location data and the obtained wind data, winds in which the given lighter-than-air vehicle is currently flying or is expected to be flying;

determine a navigation command based on the identified winds, the navigation command including information to alter a float altitude of the given lighter-than-air vehicle via one or more buoyancy adjustments and/or to control at least one of a propeller or an arm member coupled to the propeller in order to manage at least one of a location or lateral movement of the given lighter-than-air vehicle during flight; and transmit the navigation command to the given lighter-than-air vehicle.

2. The aerial vehicle control system of claim 1, wherein the one or more processors are further configured to:
construct a wind model from the identified winds;
wherein the navigation command is determined based on the constructed wind model.

3. The aerial vehicle control system of claim 1, wherein the wind data is obtained from one or more remote data sources that are not part of the aerial vehicle control system.

4. The aerial vehicle control system of claim 3, wherein the one or more remote data sources include at least one of the one or more lighter-than-air vehicles.

5. The aerial vehicle control system of claim 1, wherein determination of the navigation command includes generation of a maneuver plan for the given lighter-than-air vehicle, the maneuver plan indicating one or more locations that the given lighter-than-air vehicle should attempt to attain or maintain at corresponding times.

6. The aerial vehicle control system of claim 5, wherein the one or more locations include one or more altitudes, latitude coordinates, and/or longitude coordinates.

7. The aerial vehicle control system of claim 5, wherein the maneuver plan is either a coordinate-based maneuver plan including one or more coordinate-based navigation commands or a vector-based maneuver plan including one or more vector-based navigation commands.

8. The aerial vehicle control system of claim 5, wherein the one or more processors are further configured to determine whether the maneuver plan is to be updated based on new wind data or updated wind data.

9. The aerial vehicle control system of claim 1, wherein the navigation command includes at least one of:

an altitude command to position the given lighter-than-air vehicle at a desired altitude within a first tolerance threshold; or a lateral control command to position the given lighter-than-air vehicle at a desired coordinate within a second tolerance threshold.

10. The aerial vehicle control system of claim 9, wherein the desired coordinate includes at least one of a desired latitude coordinate or a desired longitude coordinate.

11. The aerial vehicle control system of claim 1, wherein the navigation command includes the information to control at least one of the propeller or the arm member via a lateral propulsion controller of the given lighter-than-air vehicle.

12. The aerial vehicle control system of claim 1, wherein the information of the navigation command is configured to enable adjustment of the arm member of the given lighter-than-air vehicle to cause the given lighter-than-air vehicle to move in a selected lateral direction.

13. The aerial vehicle control system of claim 12, wherein the adjustment of the arm member includes articulation of the arm member.

14. The aerial vehicle control system of claim 1, wherein the information of the navigation command includes a propulsion command to effect a lateral position adjustment for the given lighter-than-air vehicle by actuation of the propeller.

15. The aerial vehicle control system of claim 14, wherein the lateral propulsion command includes an amount of propulsion for the propeller.

16. The aerial vehicle control system of claim 1, wherein the one or more lighter-than-air vehicles comprise a fleet of multiple aerial vehicles, and the one or more processors are configured to transmit corresponding navigation commands to each of the lighter-than-air vehicles in the fleet.

17. The aerial vehicle control system of claim 16, wherein the corresponding navigation commands are configured to facilitate service provisioning among the fleet of multiple aerial vehicles.

18. The aerial vehicle control system of claim 17, wherein the service provisioning includes telecommunication services.

19. The aerial vehicle control system of claim 17, wherein the service provisioning includes provisioning of one or more of a hurricane monitoring service, a ship tracking service, an imaging service, an astronomy service, a radar service, an ecology service and a conservation service.

20. The aerial vehicle control system of claim 1, wherein the information to alter the float altitude via the one or more buoyancy adjustments includes information to control one or more ballonets of the given lighter-than-air vehicle.

* * * * *